United States Patent
Davis

[11] 3,900,543
[45] Aug. 19, 1975

[54] METHOD FOR MAKING A FOAM SEISMIC STREAMER

[75] Inventor: Billy W. Davis, Flagstaff, Ariz.

[73] Assignee: Schlumberger Technology Corporation, New York, N.Y.

[22] Filed: Oct. 26, 1972

[21] Appl. No.: 301,047

Related U.S. Application Data

[62] Division of Ser. No. 105,547, Jan. 11, 1971, Pat. No. 3,744,016.

[52] U.S. Cl. ........ 264/45.3; 161/DIG. 5; 174/101.5; 264/DIG. 6; 340/7 R; 264/45.9; 264/46.7
[51] Int. Cl. .................... G01v 1/02; H04b 13/02
[58] Field of Search ................ 264/47, 41, DIG. 6; 161/DIG. 5; 340/7 R; 174/101.5

[56] References Cited
UNITED STATES PATENTS

| | | | |
|---|---|---|---|
| 2,806,254 | 9/1957 | Craig | 264/47 |
| 2,978,340 | 4/1961 | Veatch et al. | 264/DIG. 6 |
| 3,060,512 | 10/1962 | Martin et al. | 264/41 |
| 3,272,910 | 9/1966 | Flint | 174/101.5 |
| 3,372,370 | 3/1968 | Cyr | 340/7 R |
| 3,434,104 | 3/1969 | Stapleton et al. | 340/7 R |
| 3,477,967 | 11/1969 | Resnick | 260/2.5 B |
| 3,531,760 | 9/1970 | Whitfill, Jr. | 340/7 R |
| 3,699,237 | 10/1972 | Melia | 174/101.5 |

OTHER PUBLICATIONS

Einhorn, Journal of Cellular Plastics, January 1965, pp. 25–31.

*Primary Examiner*—Ronald W. Griffin
*Attorney, Agent, or Firm*—David L. Moseley; William R. Sherman; Stewart F. Moore

[57] ABSTRACT

A neutrally buoyant seismic hydrophone streamer is constructed by extruding a syntactic foam material comprising an elastomeric material and gas filled microspheres onto a central stress member to form an elongated streamer member. The streamer may then be covered with a suitable water and oil resistant, abrasion resistant covering and be provided with exteriorly affixed hydrophones, or hydrophones can be affixed to the foam core and an outer protective sheath can be extruded or otherwise provided around the streamer and the hydrophones to provide a uniform diameter streamer assembly. Extrusion is effected utilizing a suitable elastoplastic material which can be extruded at pressures below about 300 psi to avoid bursting the gas filled spheres of the syntactic foam.

5 Claims, 3 Drawing Figures

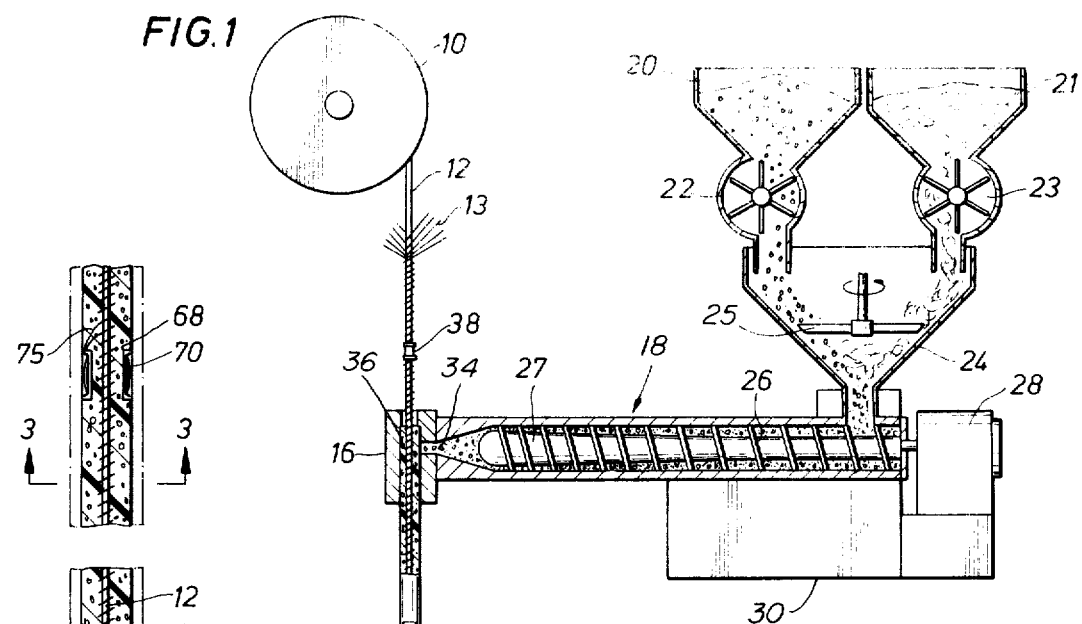
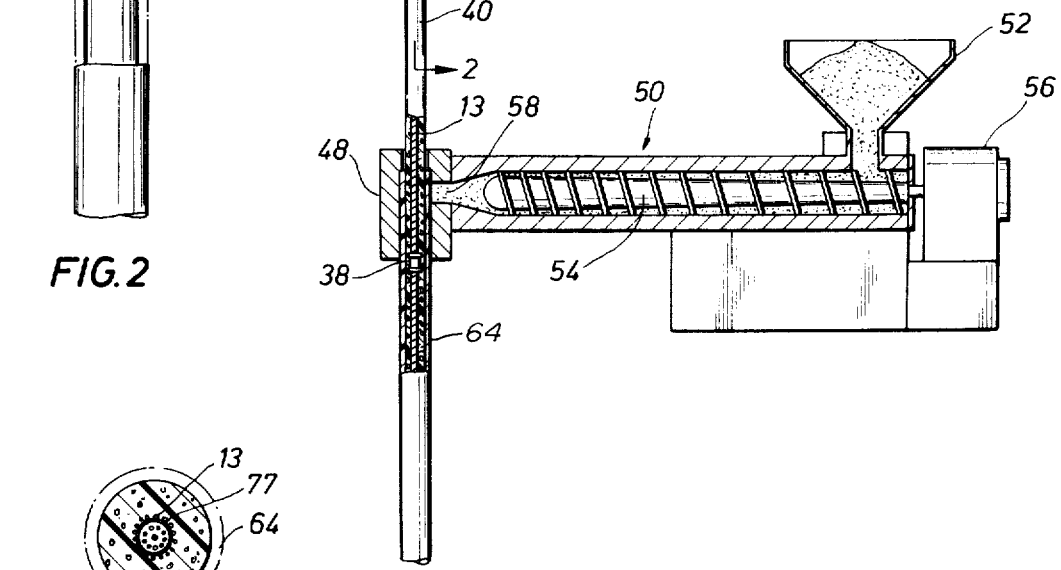
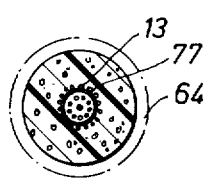
FIG.1
FIG.2
FIG.3

METHOD FOR MAKING A FOAM SEISMIC STREAMER

This application is a division of application Ser. No. 105,547, filed Jan. 11, 1971, now U.S. Pat. No. 3,744,016, issued July 3, 1973.

BACKGROUND OF THE INVENTION

The present invention relates generally to marine seismic exploration and more particularly to the provision of seismic hydrophone streamers that are neutrally buoyant in water to facilitate towing thereof at any desired water depth without necessitating the provision of externally connected buoyant devices.

In the seismic mapping of substrata under bodies of water such as the ocean, one successful method has been the towing of elongated hydrophone streamers that may reach 10,000 feet in length at various depths behind a vessel. Hydrophone transducers are disposed at intervals along the length of the streamer and are adapted to detect waves reflected from substrata beneath the surface of the body of water. The seismic waves may be sonar waves generated by the towing vessel or may be generated by explosions or other artificially produced acoustical disturbances.

When a hydrophone streamer is not neutrally buoyant in water it must be either provided with external weights or floats to enable it to remain substantially suspended at any suitable water depth. Such streamer constructions are not generally acceptable because the equipment necessary for neutral buoyancy creates water noises that interfere with the hydrophone response and create false signals.

Some types of hydrophone streamers are limited as to depth of usage because the static head of deep water severely reduces the sensitivity of the hydrophones. This adverse condition generally develops due to over compression of the streamer which retards transmission of sonar waves to the hydrophone transducer and prevents free response of the transducers thereby reducing the effective signal emitted therefrom.

While a number of different types of streamers have been manufactured commercially, the most prevalent type of hydrophone streamer is manufactured by providing an elongated flexible tubular conduit within which is disposed a plurality of spaced hydrophone transducers and a signal wire bundle establishing electrical connection between the various transducers and signal receiving circuitry disposed aboard the towing vessel. To produce neutral buoyancy the tubular conduit is generally filled with a liquid of low specific gravity, such as oil or kerosene, in order to define an overall streamer construction approaching the specific gravity of the water in which the streamer is towed, to provide a substantially neutral buoyancy enabling the streamer to be towed without necessitating the provision of external weights or buoyant devices to achieve the state of neutral buoyancy. Such a hydrophone streamer of substantially neutral buoyancy may be towed through the water at any desired depth in a substantially noise-free, efficient, and smooth manner as compared with streamer structure having external floats, weights, or the like connected thereto.

While neutrally buoyant oil or kerosene filled hydrophone streamer constructions generally solve streamer noise problems and eliminate the necessity for expensive weights or buoys, such streamers are not generally satisfactory from the standpoint of repair or operation. In order to maintain maximum seismic sensitivity, the flexible conduit must have a relatively thin wall in order to allow efficient transmission of seismic waves therethrough. Thin walled hydrophone streamers are subject to rupture thereby allowing contamination of the oil or kerosene with a corrosive fluid such as sea water which obviously results in contamination of and damage to the sensitive electrical hydrophones disposed within the conduit structure. Damage to the streamer components by the corrosive effects of sea water encroachment may render the streamer construction beyond repair.

Another disadvantage in the use of oil or kerosene filled streamers is the depth limitations that must be placed thereon because of the instability or loss of seismic efficiency that is created when fluid filled streamers are subjected to severe hydrostatic pressures.

It is also obvious that the signal bundle and the hydrophone structures themselves must be protected from damage by the oil or kerosene disposed within the tubular conduit. The cost of manufacturing a seismic hydrophone streamer of this nature is obviously adversely effected by the protective measures necessary to eliminate or reduce the potentially damaging effects of both sea water externally of the streamer and oil or kerosene disposed within the streamer structure.

Hence, substantial research has been undertaken in order to attempt the development of generally neutrally buoyant streamer constructions that are sufficiently flexible to allow spooling thereof for storage in addition to being substantially incompressible in order to allow towing thereof at any suitable water depth. One approach to solving the problem is set forth in U.S. Pat. No. 3,480,907 and involves providing a generally flexible tubular conduit structure enclosing a signal wire bundle, and hydrophone transducers. A mixture of a liquid silicone base elastomer is mixed with glass or plastic air filled particles in the form of microcapsules or microspheres and pumped into a streamer section in much the same way that oil is pumped into oil filled streamer sections. The combination of such a plastic with discrete gas filled microspheres produces a foam-like mixture referred to as syntactic foam. After cure, the elastomer becomes a substantially incompressible solid but retains its elasticity and flexibility providing a streamer that is substantially neutrally buoyant in sea water. Since the elastomer itself is insufficient to provide sufficient longitudinal strength in the streamer, a plurality of elongated stress members extend through the tubular conduit into which the elastomer was pumped in order to enhance the tensile strength of the streamer construction. But these stress members were inclined to be excessively compressed or stressed when the streamer was wound about a spool for storage purpose. The stress members would frequently break through the outer skin or more likely into the elastomeric material causing a violent motion frequently resulting in the breakage of signal wires and/or puncturing of the flexible conduit encapsulating the streamer structure. In addition, by virtue of the expense of the silicone elastomer, these silicone rubber based syntactic foam streamers have a high manufacturing cost thereby rendering them undesirable from an economic standpoint particularly for large diameter streamers.

SUMMARY OF THE INVENTION

With the view toward overcoming the aforementioned difficulties in the manufacture, use, and commercial acceptability of seismic hydrophone streamers, the present invention has for its primary object the provision of a novel seismic hydrophone streamer construction utilizing syntactic foam material extruded upon and around a central tensile stress bearing member, to minimize internal stresses encountered upon windup of the streamer. A plurality of hydrophone transducer assemblies can then be affixed to the streamer in any one of a number of ways to provide a hydrophone streamer of substantially neutral buoyancy when disposed in water.

It is another object of the present invention to provide a novel seismic hydrophone streamer construction utilizing a particulate thermoplastic material that may be mixed with gas filled microcapsules or microspheres and extruded at extremely low extruder pressures in order to prevent crushing of the microcapsules during the extrusion process.

It is another important object of the present invention to provide a novel seismic hydrophone streamer construction having a central stress member that is suitably flexible and may be wound about a conventional spool for storage purposes without subjecting the streamer construction to excessive mechanical stresses that might otherwise damage the structure of the streamer.

Among the several objects of the present invention is noted the contemplation of a novel seismic hydrophone streamer construction that is substantially incompressible thereby allowing the streamer to be towed at any desirable water depth without excessive compression that could reduce the seismic efficiency thereof.

It is also an object of the present invention to provide a novel method of manufacturing a seismic hydrophone streamer wherein discrete gas filled microparticles and particulate thermoplastic material are admixed in the heating zone of an extruder and are extruded at low extrusion pressures below about 300 psi to prevent crushing of the microparticles during the extrusion process.

It is among the several objects of this invention to provide a novel seismic hydrophone streamer that is simple in nature, reliable in use, and low in cost.

The above and other objects are achieved by the novel streamer of the instant invention which comprises a syntactic foam extrudate having a central stress member, the extrudate being formed by extruding a syntactic foam mixture comprising preferably a thermoplastic elastomeric material mixed with small gas filled microcapsules or microspheres directly onto a central stress member, such as a cable or the like. The extrusion process is conducted at relatively low pressures less than about 300 psi so as to avoid rupture of the microspheres. A suitable plastic material capable of extrusion at such low pressures, usually below about 300 psi, should be used. For example, a thermoplastic elastoplastic polymer formed from methylene-bis-4-phenyldiisocyanate and polytetramethylene glycol can be used.

The resulting neutral buoyancy streamer can then be provided with a suitable exterior sheath of abrasion resistant, water and oil impervious material and hydrophones may be affixed to the exterior thereof. In such a streamer assembly, the signal wires would be disposed exteriorly of the streamer itself and held closely to the streamer with clips or the like. Such streamers are often employed in static arrays or in like applications where the streamer is not towed and hence turbulence and noise resulting from turbulence is not a problem. Alternatively, suitable transducers or hydrophones could be disposed as desired directly on the foam core and a suitable sheath material provided around both the foam core and the hydrophones to produce a uniform diameter structure suitable for towing. In a third, preferred embodiment, a central stress member surrounded by an appropriate signal wire bundle is provided and the hydrophone transducers are mounted directly thereon and are interconnected with the signal wires. This assembly is then passed through an extruder and the syntactic foam is extruded around the central member, the signal wires, and the hydrophones to define an extrudate containing all the essential elements of a seismic streamer. Regardless, however, of the disposition of the signal wires and the outer sheath of the streamer, the streamers of this invention have a central tensile stress member.

BRIEF DESCRIPTION OF THE DRAWINGS

The invention will be better understood by reference to the drawings which are illustrative of specific embodiments. In the drawings, like reference numerals are employed to designate like parts.

FIG. 1 is an elevational view schematically illustrating the manufacture of a seismic hydrophone streamer by the extrusion process in accordance with the present invention.

FIG. 2 is a fragmentary sectional view of a seismic hydrophone streamer constructed in accordance with the present invention and showing employment of alternative structures.

FIG. 3 is a sectional view of the streamer of FIG. 2 along line 3—3 representing a modified embodiment of the present invention.

DETAILED DESCRIPTION OF THE SPECIFIC AND PREFERRED EMBODIMENTS

Reference is made to FIG. 1 which discloses, in schematic form, an extrusion process for the manufacture of seismic hydrophone streamers in accordance with the present invention. An elongated cable or like central stress member of sufficient tensile strength to support a seismic hydrophone streamer that may be on the order of 10,000 feet in length is fed from reel 10 and is spirally wrapped with a plurality of wires 13 which will constitute the signal wire bundle of the streamer. This wrapping of signal wires is accomplished by methods known in the art. Hydrophone transducers 38 are then affixed to member 12 and are interconnected with the signal wires.

The streamer is manufactured by passing the central stress member 12 with the wires 13 and hydrophones 38 in place through an appropriate aperture formed in the extrusion die 16 of an extruder 18 capable of extruding the syntactic form material. The aperture is provided with gates (not shown) to permit passage of the hydrophone into the die without permitting plastic to escape rearwardly, though the hydrophones are only slightly larger in diameter than member 12 with signal wires 13.

Suitable apparatus must be provided to obtain the admixture of plastic material and gas filled microcapsules or microspheres in the desired proportions for the foam before the extrusion is undertaken. For example, a feeder system to the extruder may include a hopper 20 containing the microspheres or microcapsules which are metered into feed hopper 24 by means of a suitable feed mechanism 22. In addition, the plastic material, preferably in the form of flakes or chips of thermoplastic polymer, is held in hopper 21 and fed to feed hopper 24 by control mechanism 23. The illustrations in FIG. 1 are schematic, and it will be appreciated that physical admixture of substances prior to extrusion is well-known in the art and can be accomplished in a number of ways.

Once the materials are fed in the desired proportions to feed hopper 24, they may be mixed by a suitable mixer such as shown by blade mixer 25 to intersperse the microspheres uniformly through the plastic material.

From feed hopper 24, the mixture of the microspheres and plastic material is fed to one end of extruder 18. A screw extruder is illustrated, although it will be appreciated that any extruder mechanism in which the pressure may be controlled to avoid crushing the microspheres may be used. Extruder screw 26 is rotated by an appropriated motor 28, and the decreasing pitch of the extruder blades as well as the increase in diameter of the central member 27 of the extruder screw further admix and pressurize the plastic-microsphere mixture as it proceeds through the extruder. The material is melted in heating zone 30 as it enters the extruder and proceeds through the extruder in a progressively more molten state. The blade action on the molten mixture of plastic and microcapsules further serves to homogenize the mixture.

The relative proportions of microspheres and plastic will of course be determined based upon the relative density of each of these ingredients and the desired amount of buoyancy desired in the ultimate streamer. In this regard it is usually desirable to provide a mixture which will produce a syntactic foam having positive buoyancy since it will be necessary to overcome the negative buoyancy of the central stress member, the hydrophone assemblies which may be affixed to the streamer and the like. Generally a syntactic foam having a specific gravity of about 0.75 to about 0.85 is desirable.

The gas filled microspheres which may be used in accordance with the instant invention are known in the art. These microspheres may range in size from about 25 to about 300 microns in diameter, and usually have a wall thickness of several microns. The microspheres generally have a specific gravity of less than about 0.40, though some have specific gravities of about 0.20 or less. Inasmuch as the plastic materials useful in accordance with this invention will generally have a specific gravity slightly greater than 1.0, typically up to about 1.2 or 1.25, it will be appreciated that the relative amounts of the plastic and of the microspheres will vary depending upon the specific gravity of each and the specific gravity ultimately desired in the syntactic foam extrudate product. It should be generally noted, however, that as the relative amount of the microspheres in the syntactic foam increases, reducing the overall specific gravity of the foam, the compressive strength and compressive modulus of the syntactic foam product will decrease.

The plastic ingredient of the syntactic foam used in this invention is a resinous material capable of extrusion, and preferably a thermoplastic resin. Of course the suitable materials must demonstrate flexibility in order that the ultimate streamer construction has the necessary flexible characteristics. However the plastics, once formed, will provide an essentially noncompressible though flexible product. The plastics must also be capable of extrusion at comparatively low pressures, less than about 300 psi, since at higher pressures microspheres in many cases will be crushed during the extrusion operation thus destroying the syntactic nature of the foam and any buoyant effect which could be obtained from it.

It will be understood that in the extrusion operation the thermoplastic material being extruded with the microspheres is in a molten state and is comparatively fluid. Indeed under such conditions, at extrusion pressures, the microspheres could be crushed despite the fact that after the extrusion operation is completed and the plastic resolidifies, the syntactic foam will be capable of sustaining higher pressures without losing buoyancy from crushing of microspheres. The comparative incompressibility of the plastic material gives the syntactic foam this characteristic and after extrusion is complete this solid, comparatively incompressible plastic surrounds the microspheres and assists in supporting them against pressure. Thus is provided a comparatively incompressible material which is lighter than water and remains capable of withstanding high pressures such as will be encountered in undersea work without loss of buoyant characteristics.

Accordingly, it will be appreciated that the extrusion must be conducted at pressures lower than normal pressures used in plastic extrusion processes which can be 2,000 pounds per square inch or more. A suitable thermoplastic compound must be therefore selected which is extrudable at relatively low pressures, below the crushing point of the microspheres, generally below 300 psi. Suitable thermoplastic polymers include for example linear polyurethanes formed from a difunctional isocyanate and a polyether glycol. The use of such glycol compounds in polyurethanes appears to give these polymers properties enabling their extrusion in comparative low pressures. The resulting polymers are strong yet flexible.

For example, a thermoplastic linear polymer of polytetramethylene ether glycol and methylene bis-4-phenyldiisocyanate, which has been referred to as a thermoplastic "elastoplastic" can be used. This urethane polymer may be extruded at pressures less than about 100 psi. Such compositions are currently sold under the name Roylar A-863 and Roylar A-863 FR by the Uniroyal Corporation.

Other compositions may also be used provided they may be extruded at pressures which can be withstood by the microspheres. Plasticizers may be employed to plasticize the thermoplastic resins to enable their extrusion at lower pressures though such plasticizers can reduce the strength of the polymer with which they are used.

It is also necessary to heat the thermoplastic-microsphere mixture during the extrusion operation. The urethane polymers as outlined above can be extruded at maximum nozzle temperatures of between about 350°F and 400°F which can be sustained by the microspheres. Extreme temperatures not sustainable by the microspheres must be avoided. In this regard it will be appreciated that microspheres composed of glass, ceramic or an appropriate thermoset resin which would be unaffected by these temperatures must be used. For example, microspheres of polyethylene or a like thermoplastic which would soften at the extruder temperatures must be obviously avoided. Glass microspheres are preferred.

Prior to extruding the syntactic foam mixture onto central stress member 12 it may be desirable to prepare the surface of central stress member 12 to form a good bond with the plastic material. It is desirable to clean all grease and dirt from the exterior of member 12 and to etch or otherwise provide a roughened surface on member 12 if such does not already exist by virtue of its cable structure. It also may be desirable to coat the stress member and the signal wires (which are already covered by their own insulative covering) with an adhesive to assist the bond to the syntactic foam. For example, if a urethane plastic is used, the cable may be coated with a urethane adhesive as known in the art.

The melted and homogenized mixture of thermoplastic and microspheres is then extruded through aperture 34 into die cavity 36 through which stress member 12 passes with the signal wires and hydrophones affixed. As the central member 12 is fed through die cavity 36, the syntactic foam mass is formed and cools around member 12, in the interstices of wires 13, and around the hydrophones 38 (shown in dotted outline downstream from extruder 18) producing a syntactic foam extrudate 40 wherein a syntactic foam core surrounds central stress member 12. Many plastics must cure following extrusion to reach their maximum strength and hence it may be desirable to permit the extruded product to cure for a time at ambient conditions prior to further treatment.

In alternate embodiments, the hydrophones may be affixed to a like syntactic foam extrudate with a central stress member in any one of several ways.

Hydrophone transducers which may be used with seismic streamers or in static arrays or the like include transducers which operate upon properties of piezoelectricity, magnetostriction or electrostriction. Piezoelectric crystal transducers are illustrated in the drawings though it will be understood that any suitable transducer assembly can be used.

The piezoelectric transducers often comprise, for example, piezoelectric crystal cylinders which may be slipped over the signal wire bundle and mounted at appropriate intervals as desired. Alternatively the transducer may comprise a split crystal, which generates electrical signals in response to the pressure fluctuations resulting from sound waves or other seismic waves impacting against the crystal during operation and can be assembled onto signal wire bundle or onto the extrudate as pointed out below at the desired intervals. The electrical signals generated by the crystals are transmitted to appropriate electrical circuitry, typically aboard the towing vessel, by the signal wires 13.

In the constructional method illustrated in FIG. 1 a plurality of seismic hydrophone transducers 38 can be attached to the exterior periphery of the signal wires and connect with the signal wires with leads 65 to produce an extrudate 40 which encapsulate these elements. Subsequently both the foam extrudate containing the hydrophone transducers may be passed through the die 48 of a second extruder illustrated generally at 50. Additional thermoplastic material suitable for extruding a protective coating which is both abrasion resistant and water and oil impermeable is disposed within hopper 52 of the extruder 50 and is fed by gravity to screw 54 driven by motor 56. The material is heated and forced through opening 58 to die 48 where it surrounds the extrudate 40 to produce a uniform thickness covering 64. The outer covering material of the streamer can be any one of many of a plastic materials exhibiting abrasion resistance and water and oil impermeability. Such materials are well-known in the art. It may be desirable to provide a fibrous net or mesh around extrudate 40 as it passes through extruder 50 to provide a fibrous reinfrocement for the covering material 64 or to use fibrous material with the covering material. It may be desirable to provide cable member 12 with a covering 77 to prevent damage to the signal wires by abrasion.

The extrusion of a coating or outer sheath on the exterior of cable or the like is well-known in the art. Polyethylene, polyamides, polyvinylchloride, synthetic rubber or the like are often used. Much the same process can be used to extrude outer sheath 64 on the foam as used to extrude the extrudate 40.

In a typical example, the central stress member 12 could be a cable about ¼ inch in diameter. The syntactic foam is deposited as a ¼ inch layer around member 12 and signal wires 13. The outer sheath has a thickness of about ⅛ inch, thus producing a streamer having an overall diameter of on the order of 1 inch. Of course, the invention is equally adaptable to streamer constructions of varying size.

Alternatively outer sheath 64 can simply be wrapped and appropriately sealed onto the extrudate 40 and the transducers to provide a generally uniform, and typically cylindrical streamer structure. In such a case the signal wires would extend to the termination of the streamer.

In a further alternative the syntactic foam can be extruded directly on member 12 to provide a neutral buoyancy streamer having a central stress member 12 which can then be provided with protective coating or sheath such as 64 and can be used as a streamer onto which are affixed external hydrophones for use in static arrays or the like.

The syntactic foam extrudate can otherwise be modified to provide recesses 68 therein to accommodate transducers.

In this embodiment the syntactic foam would be extruded directly on member 12 surrounded by signal wires 13. Recesses 68 would be mechanically cut into the extrudate after its cure and the hydrophones 70 be assembled in the recess so that a uniform thickness outer sheath 64 could be extruded onto the assembly of transducers on the extrudate. Interconnection of the transducers with the signal wires is accomplished by cutting through the foam layer and mechanically interconnecting the transducers to the signal wires 13 with leads 75. Split transducers which might be useful in such a streamer are disclosed in application Ser. No. 101,873 filed Dec. 28, 1970, now U.S. Pat. No. 3,675,193, issued July 4, 1972, entitled "Hoop Stressed Beam Hydrophone" and filed in the name of Billy W. Davis.

In view of the foregoing it is apparent that there is provided a novel seismic hydrophone streamer construction and syntactic foam extrusion process therefor that provide a relatively simple streamer construction of substantial structural integrity. The streamer construction of this invention may be wound about a spool without creating any undesirable stresses on the centrally disposed stress member nor are the signal wires of the signal wire bundle subjected to forces that might tend to break them during storage or service conditions. The seismic hydrophone streamer provided by this invention is of neutral buoyancy and thereby effectively obviates any necessity for provision of externally connected floats or weight devices that might otherwise be necessary to support the streamer as it is towed through a body of water at any suitable depth. The invention also provides a seismic hydrophone streamer that is substantially incompressible and may be utilized at extreme water depths without sacrificing the sensitivity of the hydrophone transducer. This is made possible by the extrusion of a syntactic foam about a central stress member which foam is composed of a thermoplastic material admixed with air filled microspheres structures. The extrusion process effectively eliminates high costs of manufacture and results in the provision of a seismic hydrophone streamer that is capable of ready commercial acceptance because of its low cost. It is readily understood, therefore, that this invention is well adapted to attain all of the objects and advantages hereinabove set forth together with other objects and advantages that are inherent in the apparatus itself. While certain representative embodiments and details thereof have been shown for the purpose of illustrating this invention, it will be apparent to those skilled in the art that various changes and modifications may be made therein without departing from the spirit or scope of this invention.

What is claimed is:

1. A method of manufacturing a neutral buoyancy seismic hydrophone streamer having a plurality of hydrophone transducers which comprises:

admixing a thermoplastic resin with gas filled microspheres to obtain a mixture having a specific gravity less than 1;

conveying said mixture to the heating zone of an extruder;

heating said mixture to a temperature sufficient to melt said thermoplastic resin;

extruding said mixture at a pressure less than about 300 pounds per square inch about a central streamer assembly comprising a cable-like stress member to produce a syntactic foam extrudate having a central stress member; and affixing hydrophone transducers to said extrudate.

2. The method of claim 1 wherein said central streamer assembly also comprises signal wires and hydrophone transducers assembled with respect to said central stress member, said mixture is extruded over said assembly.

3. The method of claim 1 wherein said assembly includes signal wires around said member and extending to one end of said streamer including the additional steps of forming recesses at intervals on said extrudate;

affixing said transducers to said extrudate in said recesses to produce an assembly of hydrophones on said extrudate having a uniform diameter; and interconnecting said transducers and said wires.

4. A method of manufacturing a neutral buoyancy seismic hydrophone streamer having a plurality of hydrophone transducers which comprises:

admixing a thermoplastic polymer of a bi-functional isocyanate and a polyether glycol, said polymer being extrusible at temperatures of about 300 pounds per square inch or less, with gas filled microspheres to obtain a mixture having a specific gravity less than 1;

conveying said mixture to the heating zone of an extruder;

heating said mixture to a temperature sufficient to melt said thermoplastic polymer;

extruding said mixture at a pressure less than about 300 pounds per square inch about a central streamer assembly comprising a cable-like stress member to produce a syntactic foam extrudate having a central stress member; and affixing hydrophone transducers to said extrudate.

5. The method of claim 4 wherein said thermoplastic polymer is a linear polymer of methylene bis-4-phenyldiisocyanate and polytetramethylene ether glycol.

* * * * *